US011852487B2

(12) United States Patent
Dillon et al.

(10) Patent No.: US 11,852,487 B2
(45) Date of Patent: Dec. 26, 2023

(54) METHODS AND SYSTEMS TO ENABLE TRAVEL ON A WATERWAY

(71) Applicant: Nothern Flow Inc., Seattle, WA (US)

(72) Inventors: Tim J Dillon, Bellevue, WA (US); Bradley M. Hoss, Bozeman, MT (US)

(73) Assignee: NOTHERN FLOW INC., Seattle, WA (US)

( * ) Notice: Subject to any disclaimer, the term of this patent is extended or adjusted under 35 U.S.C. 154(b) by 457 days.

(21) Appl. No.: 17/194,705

(22) Filed: Mar. 8, 2021

(65) Prior Publication Data

US 2021/0239470 A1 Aug. 5, 2021

Related U.S. Application Data

(63) Continuation-in-part of application No. 16/913,107, filed on Jun. 26, 2020, now abandoned.

(60) Provisional application No. 62/970,562, filed on Feb. 5, 2020.

(51) Int. Cl.
*G01C 21/20* (2006.01)
*G08G 3/00* (2006.01)
*G01C 21/00* (2006.01)
*B63B 79/40* (2020.01)
*B63B 79/15* (2020.01)

(52) U.S. Cl.
CPC ............ *G01C 21/203* (2013.01); *B63B 79/15* (2020.01); *B63B 79/40* (2020.01); *G01C 21/3889* (2020.08); *G08G 3/00* (2013.01)

(58) Field of Classification Search
CPC .. G01C 21/203; G01C 21/3889; G01C 21/20; B63B 79/15; B63B 79/40; G08G 3/00
See application file for complete search history.

(56) References Cited

U.S. PATENT DOCUMENTS

| 2,464,834 | A | * | 3/1949 | Taylor | B63B 22/08 |
|---|---|---|---|---|---|
| | | | | | 73/170.04 |
| 8,983,768 | B1 | * | 3/2015 | Walser | B63B 49/00 |
| | | | | | 701/467 |
| 9,207,675 | B1 | * | 12/2015 | Walser | G01C 21/3807 |
| 11,334,794 | B2 | | 5/2022 | Celano | |
| 11,620,523 | B2 | | 4/2023 | Celano | |
| 2006/0212271 | A1 | * | 9/2006 | Grenfell | A63B 69/06 |
| | | | | | 702/188 |
| 2016/0137271 | A1 | * | 5/2016 | MacCready | G01C 21/20 |
| | | | | | 114/337 |
| 2018/0188064 | A1 | * | 7/2018 | Rivers | G01C 21/203 |

(Continued)

*Primary Examiner* — Richard M Camby (57) ABSTRACT

A method to enable travel on a waterway. Here, a river run request is received from a user device. The river run request is associated with travel on a waterway and includes a user's desired time, put-in location, and take-out location. The user device includes a user interface. A river section positioned between the put-in location and the take-out location is determined. A velocity estimate associated with the river section is determined. A mileage for the river run request is determined using the desired time and the velocity estimate. A time of float is determined using the mileage and the velocity estimate. One or more of the mileage and the time of float is transmitted to the user interface for conveyance thereon. A slope between the put-in location and the take-out location is determined. The velocity estimate is determined using a hydraulic radius, the slope, and a roughness factor.

20 Claims, 5 Drawing Sheets

(56) References Cited

U.S. PATENT DOCUMENTS

| | | | |
|---|---|---|---|
| 2020/0064139 A1* | 2/2020 | Mieth | G08G 1/096844 |
| 2020/0132467 A1* | 4/2020 | Borovac | G01C 21/20 |
| 2021/0334650 A1 | 10/2021 | Celano | |
| 2022/0245456 A1 | 8/2022 | Celano | |
| 2023/0237327 A1 | 7/2023 | Celano | |

* cited by examiner

METHODS AND SYSTEMS TO ENABLE TRAVEL ON A WATERWAY

CROSS-REFERENCE TO RELATED APPLICATIONS

This application is a continuation in part of U.S. Utility patent application Ser. No. 16/913,107 filed Jun. 26, 2020, which claims priority to U.S. Provisional Application No. 62/970,562 filed Feb. 5, 2020, both of which are hereby incorporated herein by reference.

FIELD OF THE INVENTION

The present disclosure relates generally to travel. More specifically, the present disclosure describes methods and systems to enable travel on a waterway.

BACKGROUND OF THE INVENTION

A waterway is any navigable body of water. Broad distinctions are useful to avoid ambiguity, and disambiguation will be of varying importance depending on the nuance of the equivalent word in other languages. A first distinction is necessary between maritime shipping routes and waterways used by inland water craft. Maritime shipping routes typically cross oceans and seas, and some lakes, where navigability is assumed, and no engineering is required, except to provide the draft for deep-sea shipping to approach seaports (channels), or to provide a short cut across an isthmus, which is a function of ship canals. Examples of major waterways include the Suez Canal, Panama Canal, Great Lakes Waterway, and Saint Lawrence Seaway.

Streamflow, or channel runoff, is the flow of water in streams, rivers, and other channels, and is a major element of the water cycle. Stream discharge is typically derived from four sources: channel precipitation, overland flow, interflow, and groundwater. Rivers are always moving, which is good for environment, as stagnant water usually does not stay fresh and inviting very long. There are many factors, both natural and human-induced, that can cause rivers to continuously change. Streamflow is typically measured as an amount of water passing through a specific point over time and is measured in the United States as cubic feet per second ("CFS"), while in other countries cubic meters per second are utilized.

A stream gauge provides continuous flow over time at one location for water resource and environmental management or other purposes. A typical waterway can have several stream gauge stations at which streamflow measurements are captured. However, solutions known in the arts for traveling via waterway typically fail to provide time estimates for traversing a certain distance on a waterway, distance estimates for traveling within certain time constraints.

BRIEF DESCRIPTION OF THE DRAWINGS

Some of the embodiments will be described in detail, with reference to the following figures, wherein like designations denote like members, wherein.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure. Such embodiments are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. Note that the computer-usable or computer-readable medium could even be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. As used herein, "real-time" information refers to information that is received by a recipient computing device without perceived delay subsequent to its input in a transmitting computing device.

A waterway is any navigable body of water. Broad distinctions are useful to avoid ambiguity, and disambiguation will be of varying importance depending on the nuance of the equivalent word in other languages. A first distinction is necessary between maritime shipping routes and waterways used by inland water craft. Maritime shipping routes typically cross oceans and seas, and some lakes, where navigability is assumed, and no engineering is required, except to provide the draft for deep-sea shipping to approach seaports (channels), or to provide a short cut across an isthmus, which is a function of ship canals. Examples of major waterways include the Suez Canal, Panama Canal, Great Lakes Waterway, and Saint Lawrence Seaway.

Streamflow, or channel runoff, is the flow of water in streams, rivers, and other channels, and is a major element of the water cycle. Stream discharge is typically derived from four sources: channel precipitation, overland flow, interflow, and groundwater. Rivers are always moving, which is good for environment, as stagnant water usually does not stay fresh and inviting very long. There are many factors, both natural and human-induced, that can cause rivers to continuously change. Streamflow is typically measured as an amount of water passing through a specific point over time and is measured in the United States as cubic feet per second ("CFS"), while in other countries cubic meters per second are utilized.

As used herein, a "put-in" refers to a location along a waterway where watercrafts are launched or the act of launching a watercraft on a waterway; a "take-out" refers to a location along a waterway where watercrafts can be removed from the waterway or the act of removing a watercraft from the waterway; "desired time" is a user-defined variable that refers to the total time the user wishes to travel along a waterway (e.g., User A wants to take a 90-minute trip along the Acme Canal); and "time of float" or "float time" refer to the estimated time it will take a user to travel along a waterway between a put-in and take-out (e.g., it will take User A 120 minutes to travel between "put-in A" and "take-out A" along the Acme Canal).

As used herein, "waterway mileage" refers to the distance along a waterway (i.e. following the curvature of the waterway) between two or more points; "access sites" and "access points" refer to locations along a waterway where users can access the waterway to put in or take out; "river miles" refer to the length of a section of water following a waterway; "CFS" refers to cubic feet per second and are units used to measure streamflow (e.g., in the United States); and "waterway section" or "section" refers to the waterway positioned below an upriver data collection site.

A stream gauge provides continuous flow over time at one location for water resource and environmental management or other purposes. A typical waterway can have several stream gauge stations at which streamflow measurements are captured. However, solutions known in the arts for traveling via waterway typically fail to provide time estimates for traversing a certain distance on a waterway, distance estimates for traveling within certain time constraints.

The present disclosure includes many aspects and features. Moreover, while many aspects and features relate to, and are described in the context of methods and systems to enable travel on a waterway, embodiments of the present disclosure are not limited to use only in this context. The instant disclosure seeks to provide systems and methods to enable the use of water velocity forecasts to approximate the time it will take a watercraft (e.g., a boat, raft, kayak, canoe or floating individual, etc.) to float a given distance down a waterway to an access site or desired location. The systems and methods can further provide alerts (e.g., weather and water), interactive waterway maps, and scheduling service to enhance travel via waterway. For example, the time it takes for an individual to float from point A to point B is typically unknown by that individual. The systems and methods can use a variety of data types, but preferably use historical and real time data collected by the United States Geological Survey ("USGS"), elevation points, river mileage to determine roughness factor, hydraulic radius, and slope.

Figure 1:
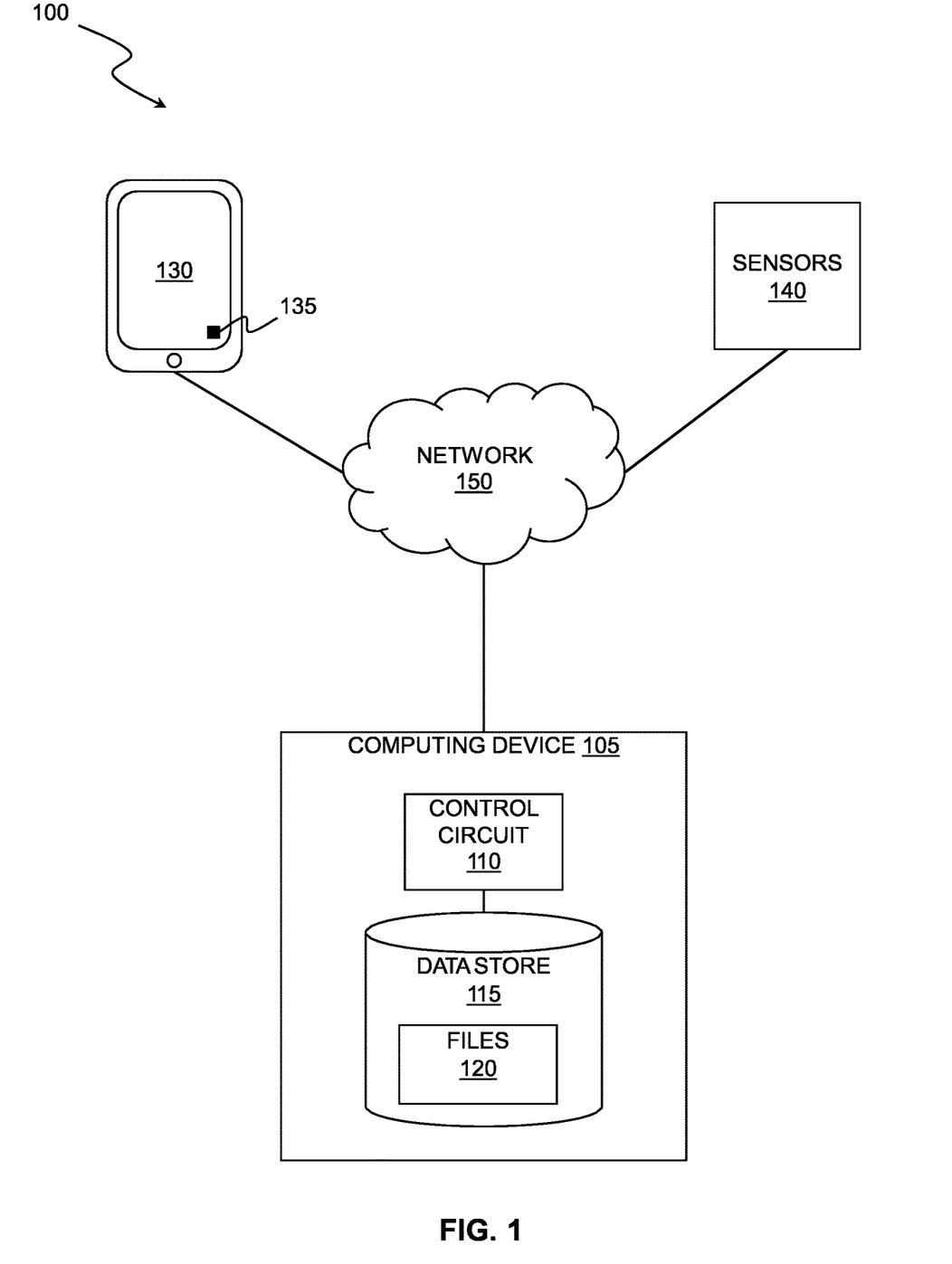
FIG. 1 depicts a block diagram of an environment to enable travel on a waterway, according to some embodiments.

FIG. 1 depicts a block diagram of an environment, generally 100, to enable travel on a waterway, according to some embodiments. The environment 100 includes a user device 130, sensor(s) 140, and computing device 105 in communication via network 150. The user device 130 and/or the computing device 105 can be a desktop computer, a wearable computer, a mobile computing device, a laptop computer, a tablet computer, a computer server, a vehicular-based computer, a home-integrated computer, a thin client, and/or any computing device that can compute code and communicate, in accordance with an embodiment of the present invention. In some embodiments, the user device 130 and the computing device 105 together are a single unit or system. In other embodiments, the user device 130 is a mobile device.

In certain embodiments, the computing device 105 is a server computing device. The user device 130, the sensor 140 and/or the computing device 105 can transmit information in real-time. Network 150 can be, for example, a local area network (LAN), a wide area network (WAN) such as the Internet, or a combination of the two, and can include wired, wireless, or fiber optic connections. In general, network 150 can be any combination of connections and protocols that support communications between the computing device 105, the user device 130, and the sensors 140.

The user device 130 is a device that allows users to generate and transmit requests (e.g., river run requests) to the computing device 105. In preferred embodiments, each river run request includes a desired time, a put-in location and a take-out location as defined by the user, for example, using the user device 130. In other embodiments, a river run request includes a waterway and a desired time as defined by the user. Here, the equations of the instant disclosure can be reorganized to solve for unknown variables (e.g., the put-in location and the take-out location). The user device 130 preferably includes a user interface 135. For example, the user interface 135 can be a web-based software application, a website, desktop application, or a mobile application ("app") provided by the computing device 105. The computing device 105 includes at least one control circuit 110 communicatively coupled to a data store 115. The data store 115 is an information repository that includes files 120. The files 120 preferably include data generated by the sensors 140 (e.g., historical and real-time data). The files 120 includes data related to waterway width, depth, flow rate, velocity, temperature, elevations, locations, access sites, gradients, surrounding land, channel location, as well as similar data types related to waterway travel (e.g., information associated with waterway access sites and data collection sites).

The sensors 140 are devices that measure, capture, and/or generate one or more data types (e.g., geospatial, water temperature, streamflow, elevation, latitude, longitude, gradient, etc.). In some embodiments, the sensors 140 generate data generate real-time data. The sensors 140 preferably include devices that measure the streamflow of waterways. For example, the USGS provides data on specific rivers, streams or bodies of water. Such waterway specific data is also available for other countries (e.g., Canada, France, Belgium, Japan, etc.). The files 120 preferably include historical waterway data (e.g., dates, times, instantaneous and historical CFS, historical channel areas, observed historical widths, observed channel velocities, channel materials and site locations). The files 120 can also include real time waterway data. The control circuit(s) 110 is a device that is configured to perform one or more of the steps, processes, and/or functions disclosed in the instant application.

Figure 2:
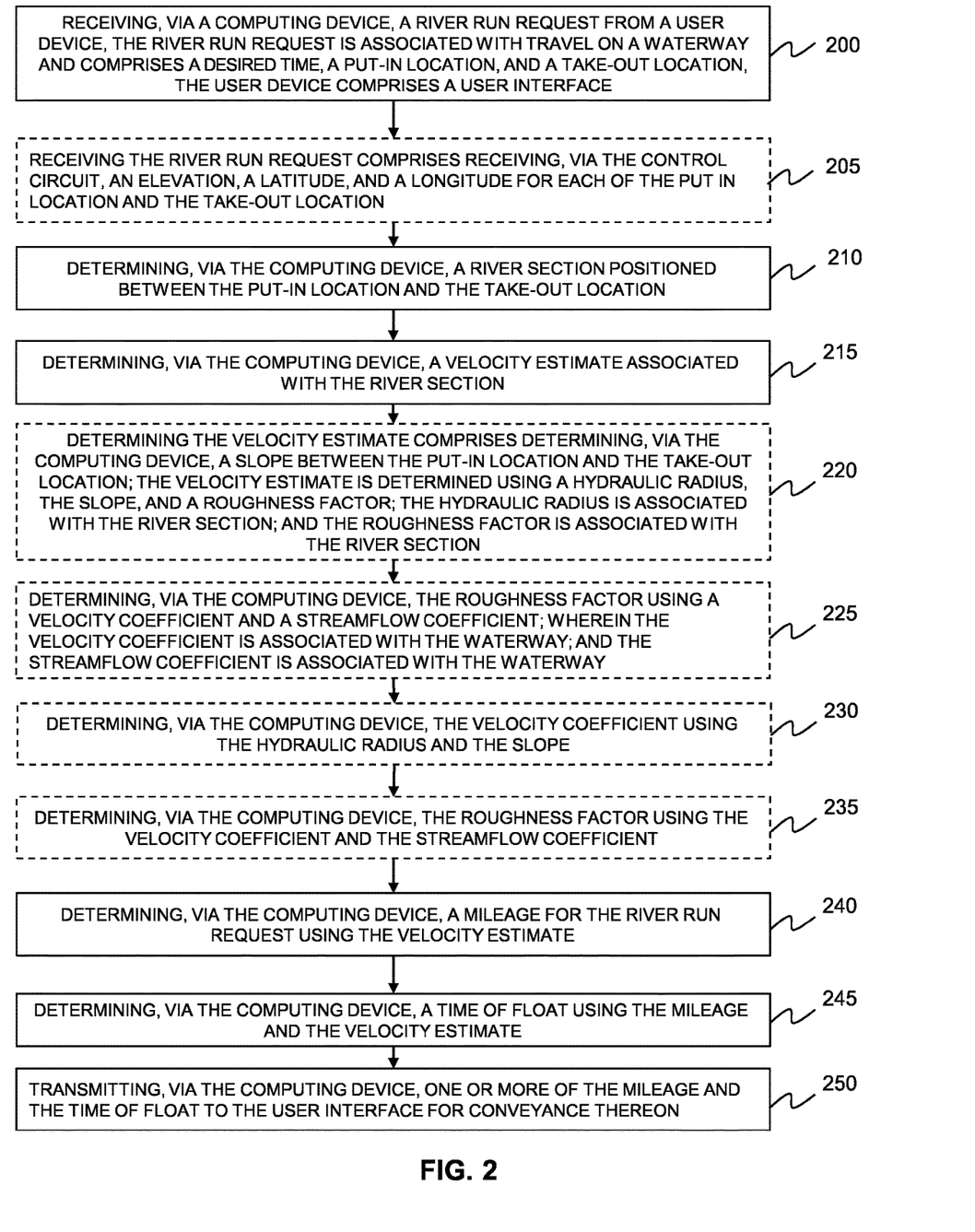
FIG. 2 illustrates the operational steps of a method to enable travel on a waterway, according to other embodiments.
Figure 3:
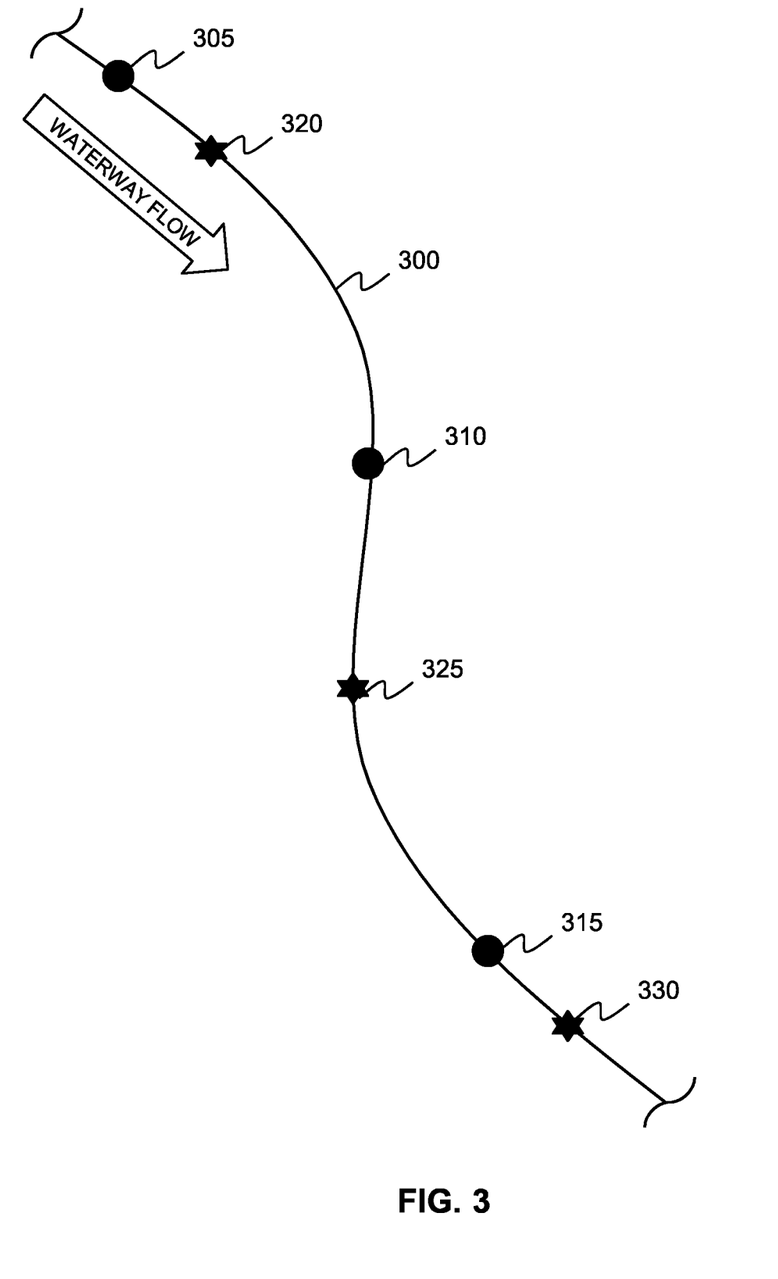
FIG. 3 depicts a top view of a waterway section, according to certain embodiments.
Figure 4:
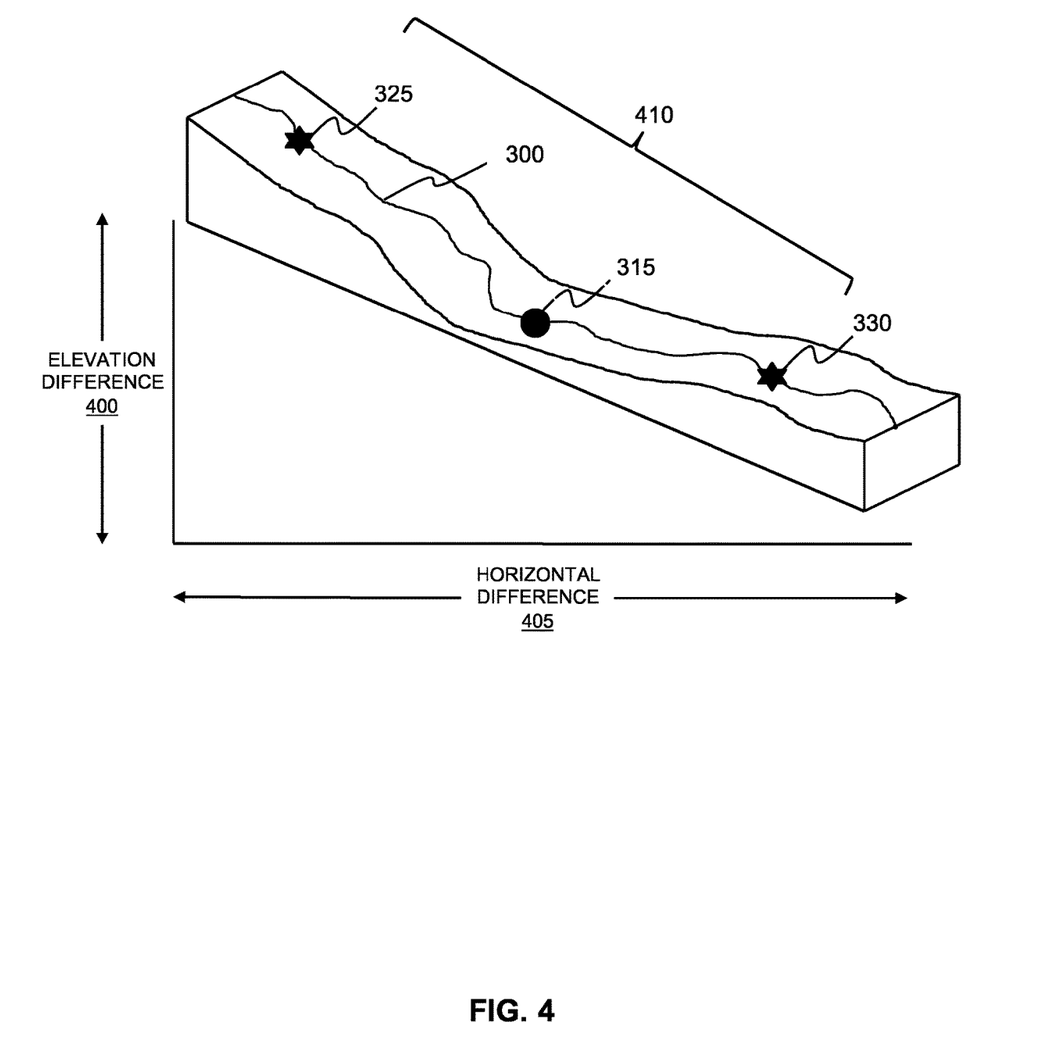
FIG. 4 depicts a cut-thru view of a portion of the waterway section of FIG. 3, according to yet still other embodiments.

FIG. 2 illustrates the operational steps of a method to enable travel on a waterway, according to other embodiments. FIGS. 3 and 4 are used to convey concepts disclosed during the discussion of FIG. 2. The instant disclosure seeks to provide methods and systems to enable users of watercrafts (e.g., kayaks, paddle boards, canoes, and similar watercrafts) to travel between put-in and take-out locations with an increased logistical understanding of the trip. For example, the instant disclosure seeks to provide methods to determine the average velocity of water flowing between a put-in and take-out locations, the time of float (i.e. the time required to float between two locations), as well as the waterway mileage (i.e. distance traveled within a desired time). In addition, the methods of the instant disclosure seek to estimate the distance traveled on a waterway ("waterway mileage") given a user's desired travel time.

To be sure, the files 120 includes historical and/or real time waterway data (e.g., captured by the sensors 140 or similar devices), which includes, but is not limited to, streamflow, elevation points, river mileage, and similar. The files 120 also include other data associated with waterways (e.g., roughness factors, hydraulic radius, slopes, etc.).

To begin, at Step 200, a river run request for travel on a waterway (e.g., waterway 300) is received and includes a desired time, a put-in location, and a take-out location. For example, the desired time, the put-in location, and the take-out location are defined by the user. FIG. 3 depicts a top view of the waterway section 300, according to certain embodiments. Waterway section 300 can be a section of a river, canal, channel, or other route for travel by water. The waterway section 300 includes data collection sites 305, 310, and 315, which are waterway data collection sites. As reflected in FIG. 4, for example, the access site 325 can be the put-in location and the access site 330 can be the take-out location. The waterway section 300 further includes access sites 320, 325, and 330, which can include boat ramps, soft launches, and similar waterway access sites. To be sure, the access sites 320, 325, and/or 330 can each function as put-in locations and/or take-out locations. The current or waterway flows from data collection site 305 towards the data collection site 315. Although FIG. 3 depicts one access site positioned between the data collection sites, waterways (e.g., the waterway 300) can have any quantity of access sites positioned between data collection sites and vice-versa.

For example, historical waterway data collected via the data collection sites 305, 310, and 315 are preferably stored in the files 120 and can include dates, times, instantaneous and historical CFS, historical channel areas, observed historical widths, observed channel velocities, channel materials, and/or site locations (e.g., geospatial data of site location). In some embodiments, receiving the river run request of Step 200 includes receiving the user's desired time (defined above) as well as the elevation, latitude, and longitude for each of the put-in location (e.g., the access site 325) and the take-out location (e.g., the access site 330) as reflected in Step 205. To be sure, the accuracy of the velocity forecasts increases as the number of data collection sites between the put-in and take out locations increases. The data from multiple data collection sites can be averaged for accuracy (e.g., the mean, median, or mode of data sets can be used). FIG. 4 depicts a cut-thru view of a portion of the waterway 300, generally river section 410, as well as an elevation difference 400 and a horizontal difference 405 of the river section 410, which includes data collection site 315 positioned between access site 325 and the access site 330.

In other words, the files 120 include elevation data, longitudinal data and latitudinal data for each of the access sites 320, 325, and 330. In some embodiments, one or more of the sensors 140 captures the aforementioned elevation data, longitudinal data and latitudinal data for each of the access sites 320, 325, and 330. At Step 210, a river section 410 that is positioned between the put-in location and the take-out location is determined. At Step 215, a velocity estimate associated with the river section 410 is determined. For example, the velocity estimate can be determined using Equations [1-6]:

$$\text{Average Velocity} = \frac{1.486}{n} * HR^{\frac{2}{3}} * S^{1/2} \qquad \text{Eq. [1]}$$

$$\text{Hydraulic Radius} = HR = \frac{\text{Width} * \text{Depth}}{(2 * \text{Depth}) + \text{Width}} \qquad \text{Eq. [2]}$$

$$n_{optimal} = \frac{n_v + n_c}{2} \qquad \text{Eq. [3]}$$

$$n_v = \frac{HR^{\frac{2}{3}} * S^{\frac{1}{2}} * K}{V} \qquad \text{Eq. [4]}$$

$$n_c = \frac{\text{Area} * HR^{2/3} * S^{\frac{1}{2}} * K}{CFS} \qquad \text{Eq. [5]}$$

$$\text{Slope(ft)} = \qquad \text{Eq. [6]}$$

$S = $ up river site elevation $-$ down river site elevation $=$ $\text{site}_n \text{elevation} - \text{site}_{n+1} \text{elevation}$ where K is a constant valued at 1.486; width is the width at the data collection site; depth is the depth at the data collection site; and $n_{optimal}$ or n is the roughness factor and is solved using $n_v$, the velocity coefficient, and $n_c$, the streamflow coefficient. Average velocity refers to the average instantaneous velocity of the river section 410 as opposed to the actual time it took the user to travel between the put-in location and the take-out location. To be sure, the roughness factor is solved using the historical data associated with the each of the data collection sites included in the river section 410 (i.e. the data collection site 325).

Here, the hydraulic radius of the data collection site 315 is determined. Similarly, the slope of the river section 410 (i.e. the slope between the access site 325 and the access site 300) is determined. In certain embodiments, to determine the velocity estimate of Step 215, the slope between the put-in location and the take-out location is determined (Step 220). Here, the velocity estimate is determined using the hydraulic radius, slope, and roughness factor. Both the hydraulic radius and the roughness factor are each associated with the river section 410 (i.e. the data collection site 315). At Step 225, the roughness factor "n" is determined using a velocity coefficient (e.g., determined using Eq. [4]) and a streamflow coefficient (e.g., determined using Eq. [5]). The velocity coefficient is associated with the waterway (i.e. the river section 410), and the streamflow coefficient is associated with the waterway.

At Step 230, the velocity coefficient is determined using the hydraulic radius and the slope. At Step 235, the roughness factor is determined using the velocity coefficient and the streamflow coefficient. At Step 240, a mileage for the river run request ("waterway mileage") is determined using the desired time and the velocity estimate (i.e. the average velocity). For example, the mileage for the river run request can be determined using Eq. [7]:

Waterway Milage=desired time*average velocity    Eq. [7]

In other words, waterway milage is the distance a user travels on the waterway between points and is defined as the product of the desired time (e.g., as defined by the user in the river run request) and the average velocity (e.g., as derived using Eq. [1]). At Step 245, a time of float is determined using the mileage and the velocity estimate. For example, the time of float can be determined using Eq. [8]:

$$\text{Time of float} = \frac{\text{waterway milage}}{\text{average velocity}} \qquad \text{Eq. [8]}$$

At Step 250, the waterway mileage and/or the time of float are transmitted to the user interface 135 for conveyance thereon.

Figure 5:
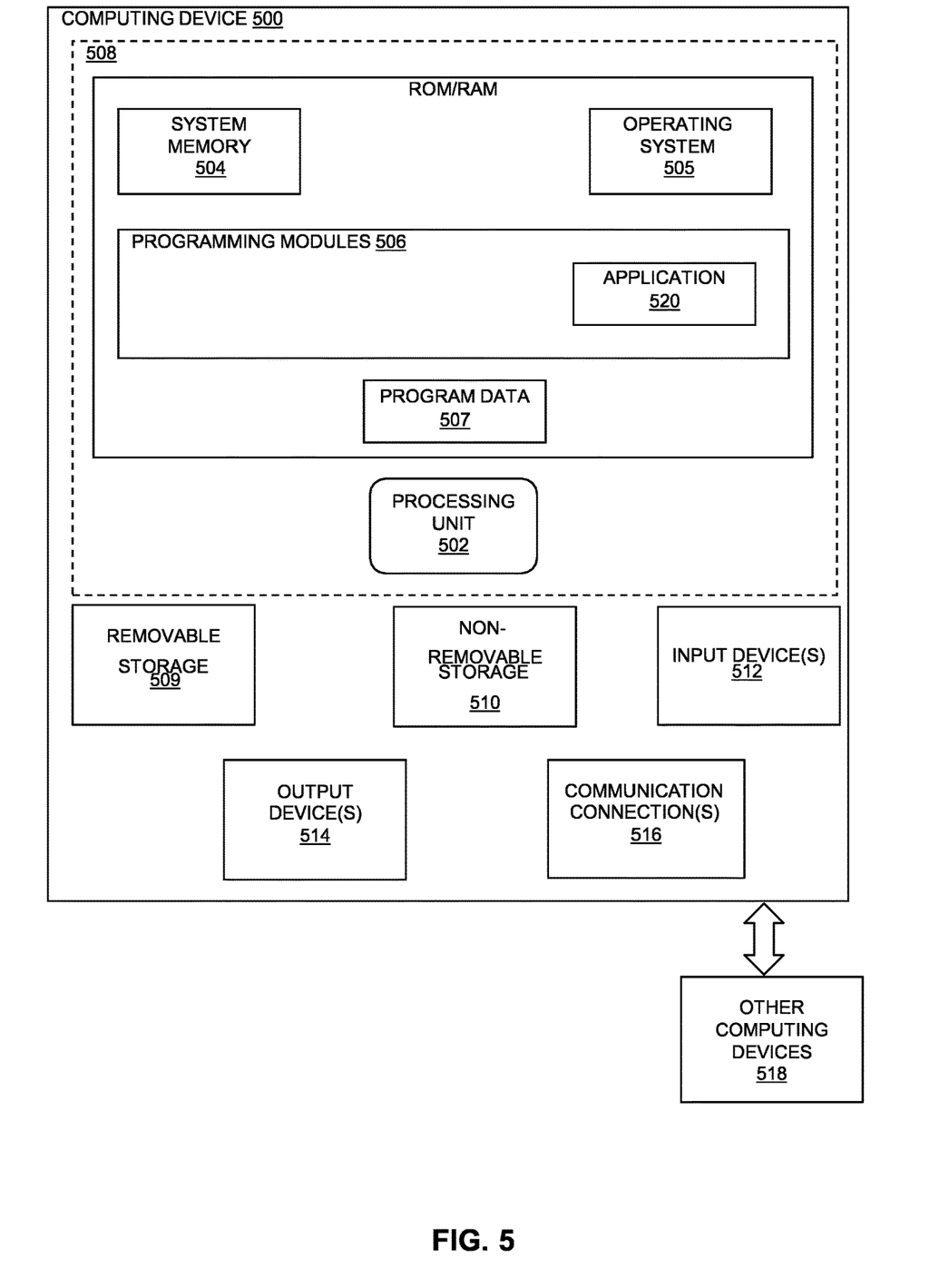
FIG. 5 depicts a block diagram of the components of a computing device, according to some embodiments.

With reference to FIG. 5, a system consistent with an embodiment of the disclosure may include a computing device or cloud service, such as computing device 500. Computing device 500 can represent computing device 105 and the user device 130. In a basic configuration, computing device 500 may include at least one processing unit 502 (e.g., control circuit 110) and a system memory 504. Depending on the configuration and type of computing device, system memory 504 may comprise, but is not limited to, volatile (e.g. random-access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include machine learning module. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer-readable instructions, data structures, program modules, or other data. System memory 504, removable storage 509, and non-removable storage 510 are all computer storage media examples (i.e., memory storage).

Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, a location sensor, a camera, a biometric sensor, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502 (e.g., control circuit 110), programming modules 506 (e.g., application 520 such as a media player) may perform processes including, for example, one or more stages of methods, algorithms, systems, applications, servers, databases as described above. The aforementioned process is an example, and processing unit 502 (e.g., control circuit 110) may perform other processes. Other programming modules that may be used in accordance with embodiments of the present disclosure may include machine learning application.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

What is claimed is:

1. A method to enable travel on a waterway, comprising:
receiving, via a computing device, a river run request from a user device, the river run request is associated with travel on a waterway, the user device comprises a user interface;
determining, via the computing device, a river section positioned between a put-in location and a take-out location;
determining, via the computing device, a velocity estimate associated with the river section;
determining, via the computing device, a mileage for the river run request;
determining, via the computing device, a time of float using the mileage and the velocity estimate;
transmitting, via the computing device, one or more of the mileage and the time of float to the user interface for conveyance thereon
wherein the river run request comprises a desired time, the put-in location, and the take-out location; and
wherein determining the mileage comprises determining, via the computing device, the mileage using the desired time and the velocity estimate.

2. The method of claim 1, wherein
determining the velocity estimate comprises determining, via the computing device, a slope between the put-in location and the take-out location;
determining the velocity estimate comprises determining the velocity estimates using a hydraulic radius, the slope, and a roughness factor;
the hydraulic radius is associated with the river section; and
the roughness factor is associated with the river section.

3. The method of claim 2,
further comprising determining, via the computing device, the roughness factor using a velocity coefficient and a streamflow coefficient;
wherein
the velocity coefficient is associated with the waterway; and
the streamflow coefficient is associated with the waterway.

4. The method of claim 1, further comprising determining, via the computing device, the velocity coefficient using the hydraulic radius and the slope.

5. The method of claim 4, further comprising, via the computing device, determining the streamflow coefficient using an area of the waterway, the hydraulic radius, and the slope.

6. The method of claim 5, further comprising determining, via the computing device, the roughness factor using the velocity coefficient and the streamflow coefficient.

7. The method of claim 6, wherein receiving the river run request comprises receiving, via the control circuit, an elevation, a latitude, and a longitude for each of the put in location and the take-out location.

8. The method of claim 7, wherein the user device is a mobile device.

9. A system to enable travel on a waterway, comprising:
a user device that comprises a user interface;
a control circuit communicatively coupled to the user device and configured to:
receive a river run request that is associated with travel on a waterway;
determine a river section positioned between a put-in location and a take-out location;
determine a velocity estimate associated with the river section;
determine a mileage for the river run request using a desired time and the velocity estimate;
determine a time of float using the mileage and the velocity estimate;
transmit the mileage and the time of float to a user interface for conveyance thereon;
wherein the river run request comprises the desired time, the put-in location, and the take-out location; and
wherein in determining the mileage the control circuit uses the desired time and the velocity estimate.

10. The system of claim 9, wherein
the control circuit is further configured to:
determine a slope between the put-in location and the take-out location;
determine the velocity estimate using a hydraulic radius, the slope, and a roughness factor;
the hydraulic radius is associated with the river section; and
the roughness factor is associated with the river section.

11. The system of claim 10, wherein
in determining the velocity estimate, the control circuit is further configured to determine the roughness factor using a velocity coefficient and a streamflow coefficient;
the velocity coefficient is associated with the waterway; and
the streamflow coefficient is associated with the waterway.

12. The system of claim 11, wherein the control circuit is further configured to determine the velocity coefficient using the hydraulic radius and the slope.

13. The system of claim 12, wherein the control circuit if further configured to determine the streamflow coefficient using an area of the waterway, the hydraulic radius, and the slope.

14. The system of claim 13, wherein the control circuit if further configured to determine the roughness factor using the velocity coefficient and the streamflow coefficient.

15. The system of claim 14, wherein in receiving the river run request, the control circuit is further configured to receive an elevation, a latitude, and a longitude for each of the put in location and the take-out location.

16. The system of claim 15, wherein the user device is a mobile device.

17. A method to enable travel on a waterway, comprising:
receiving, via a computing device, a river run request from a user device, the river run request is associated with travel on a waterway, the user device comprises a user interface, the waterway;
determining, via the computing device, a river section positioned between a put-in location and a take-out location;
determining, via the computing device, a velocity estimate associated with the river section using a hydraulic radius, a slope between the put-in location and the take-out location, and a roughness factor, the hydraulic radius is associated with the river section, the roughness factor is associated with the river section;
determining, via the computing device, a mileage for the river run request using a desired time and the velocity estimate;
determining, via the computing device, a time of float using the mileage and the velocity estimate;
transmitting, via the computing device, one or more of the mileage and the time of float to the user interface for conveyance thereon;
wherein the river run request comprises the desired time, the put-in location, and the take-out location; and
wherein determining the mileage comprises determining, via the computing device, the mileage using the desired time and the velocity estimate.

18. The method of claim 17,
further comprising:
determining, via the computing device, the roughness factor using a velocity coefficient and a streamflow coefficient;
determining, via the computing device, the velocity coefficient using the hydraulic radius and the slope;
wherein
the velocity coefficient is associated with the waterway; and
the streamflow coefficient is associated with the waterway.

19. The method of claim 18, further comprising:
determining the streamflow coefficient using an area of the waterway, the hydraulic radius, and the slope; and
determining, via the computing device, the roughness factor using the velocity coefficient and the streamflow coefficient.

20. The method of claim 19, wherein
receiving the river run request comprises receiving, via the control circuit, an elevation, a latitude, and a longitude for each of the put in location and the take-out location; and
the user device is a mobile device.

* * * * *